US012065942B2

(12) United States Patent
Baralon

(10) Patent No.: US 12,065,942 B2
(45) Date of Patent: Aug. 20, 2024

(54) GAS TURBINE ENGINE FAN

(71) Applicant: Rolls-Royce plc, London (GB)

(72) Inventor: Stephane M M Baralon, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/303,430

(22) Filed: Apr. 19, 2023

(65) Prior Publication Data

US 2023/0383654 A1 Nov. 30, 2023

Related U.S. Application Data

(63) Continuation-in-part of application No. 16/952,534, filed on Nov. 19, 2020, now abandoned.

(30) Foreign Application Priority Data

Nov. 27, 2019 (GB) ..................................... 1917266

(51) Int. Cl.
*F01D 5/02* (2006.01)

(52) U.S. Cl.
CPC .......... *F01D 5/021* (2013.01); *F05D 2220/32* (2013.01); *F05D 2220/36* (2013.01)

(58) Field of Classification Search
CPC ............................. F01D 5/021; F05D 2220/36
See application file for complete search history.

(56) References Cited

U.S. PATENT DOCUMENTS 5,486,553 A 1/1996 Deaner et al.
5,539,027 A 7/1996 Deaner et al.
6,071,077 A 6/2000 Rowlands
8,337,154 B2 12/2012 Decker et al.
9,470,093 B2 10/2016 Gallagher et al.
10,584,715 B2 3/2020 Gallagher et al.
2010/0068064 A1 3/2010 Nagai et al.
2013/0340406 A1 12/2013 Gallagher et al.
2016/0356285 A1 12/2016 Gallagher et al.
(Continued)

FOREIGN PATENT DOCUMENTS

EP 3098384 A1 11/2016
EP 3108107 12/2016
EP 3214268 A1 9/2017
(Continued)

OTHER PUBLICATIONS

European search report dated Jul. 5, 2021, issued in EP patent applicaiton No. 20206447.
(Continued)

*Primary Examiner* — Lorne E Meade
(74) *Attorney, Agent, or Firm* — Shumaker & Sieffert, P.A.

(57) ABSTRACT

A fan stage of a ducted fan gas turbine engine has a rotor hub having a principal axis of rotation and a plurality of fan blades having a hub end attached to the hub and extending radially towards a tip end so as to define a blade span dimension. Each blade has a leading and a trailing edge, a chord for a section of the blade being a straight line joining the leading and trailing edges within the section. A difference between a stagger angle in a mid-span region and in the vicinity of the tip end of each blade is greater than or equal to 20°. The fan blades are twisted to a greater extent than conventional between the mid-span and tip end. A camber angle difference between the mid-span region and the tip end may be greater than 30 degrees.

7 Claims, 6 Drawing Sheets

(56) References Cited

U.S. PATENT DOCUMENTS

2021/0156260 A1 5/2021 Baralon

FOREIGN PATENT DOCUMENTS

| | | | |
|---|---|---|---|
| EP | 3489461 | A2 | 5/2019 |
| EP | 3656982 | A1 | 5/2020 |
| WO | 2015126715 | A1 | 8/2015 |
| WO | 2015175044 | A1 | 11/2015 |

OTHER PUBLICATIONS

Extended Search Report from counterpart European Application No. 22170970.2 dated Jan. 10, 2023, 8 pp.

Great Britain search report dated May 20, 2020, issued in GB Patent Application No. 1917266.7.

Great Britain search report dated Nov. 8, 2020, issued in GB Patent Application No. 1917266.7.

Prosecution History from U.S. Appl. No. 16/952,534, dated Apr. 19, 2022 through Feb. 17, 2023, 120 pp.

Response to Extended Search Report dated Jul. 14, 2021 from counterpart European Application No. 20206447.3, filed Feb. 11, 2022, 59 pp.

Shahsavari et al., "Aerodynamic Design of a Highly Loaded Axial Flow Fan Rotor using a Novel One-Dimensional Design Method with its Numerical Simulation", GT2016-57333, Proceedings of ASME Turbo Expo 2016: Turbomachinery Technical Conference and Exposition, Seoul, South Korea, Jun. 17, 2016, pp. 1-13. (Year: 2016).

GAS TURBINE ENGINE FAN

This application is a continuation in-part of U.S. patent application Ser. No. 16/952,534, filed 19 Nov. 2020, which claims the benefit of GB Patent Application No. GB1917266.7, filed 27 Nov. 2019, the entire content of each application is incorporated herein by reference.

The present disclosure concerns a gas turbine engine and, more specifically, a fan blade or fan stage for a gas turbine engine.

BACKGROUND OF THE DISCLOSURE

Geared turbofan engines comprise a gearbox between the low-pressure turbine and the fan, allowing the fan to be driven at a lower rotational speed to provide a greater efficiency.

The lower fan pressure ratios of geared fan engines lead to a greater separation of the cruise level and the sea level static pressure operating curves of the fan blade. This makes managing the aerodynamic stability margin requirements (i.e. the margin of air flow before stall or flutter of the fan blade etc.) more arduous. Conventional ways of improving stability margin carry a performance, weight or cycle penalty. For example, it may require: more fan blades, greater fan blade chords, reduced aerodynamic loadings, higher tip speeds or higher design point pressure ratio.

It is also conventional for fans to be designed so that all the radial sections of the fan blades achieve their local peak efficiency at the same time, thus maximising the overall peak efficiency of the fan blade. This is designed to occur in the cruise operating region where the biggest benefit to fuel consumption is achieved. Peak efficiency is achieved by providing the radial sections of the fan blade at an optimum stagger angle for a given configuration. The current focus on fuel efficiency within the aerospace industry cannot be understated.

It is an aim of the present disclosure to find an alternative fan blade design configuration. It may be an additional or alternative aim to find a fan blade design that is better suited to the slower rotational speeds associated with the geared fan configuration.

BRIEF SUMMARY OF THE DISCLOSURE

According to a first aspect of the disclosure there is provided a fan stage of a ducted fan gas turbine engine, comprising: a rotor hub having a principal axis of rotation; a plurality of fan blades, each blade having a hub end attached to the hub and extending radially outwardly towards a tip end so as to define a blade span dimension, each blade further having a leading edge and a trailing edge, a chord for a section of the blade being a straight line joining the leading and trailing edges within the section and a stagger angle being the angle formed between the chord and the principal axis of rotation; wherein the difference between the stagger angle in a mid-span region of each blade and the stagger angle in the vicinity of the tip end of each blade is greater than or equal to 20° and less than or equal to 80°.

According to a second aspect of the disclosure, there is provided a fan blade for a gas turbine engine, comprising: a hub end for attachment to a rotor hub in use, the blade extending from the hub end towards a tip end so as to define a blade span dimension, the blade further having a leading edge and a trailing edge, a chord for a sectional profile of the blade being a straight line joining the leading and trailing edges within the sectional profile; wherein a relative difference in angle between a chord in a mid-span region of the blade and a chord in the vicinity of the tip end of the blade is greater than or equal to 20° and less than or equal to 80°.

According to a third aspect of the disclosure there is provided a fan stage of a ducted fan gas turbine engine, comprising: a rotor hub having an axis of rotation; a plurality of fan blades, each blade having a hub end suitable for attachment to rotor hub in use and each blade extending radially outwardly towards a tip end so as to define a blade span dimension, each blade further having a leading edge and a trailing edge; a blade inlet angle at the leading edge of each blade being defined as the angle between a local axis of the blade at the leading edge and the axis of rotation; a blade outlet angle at the trailing edge of each blade being defined as the angle between a local axis of the blade at the trailing edge and the axis of rotation; a camber angle defined as a difference in the blade inlet angle and the blade outlet angle for a common sectional profile of the blade; a mid-span region comprising a first camber angle; a tip end comprising a second camber angle; and wherein a difference between the first and second camber angles is greater than 30 degrees and less than or equal to 70°.

According to a fourth aspect of the disclosure, there is provided a fan blade for a ducted fan gas turbine engine, comprising: a hub end suitable for attachment to rotor hub in use, the blade extending toward a tip end so as to define a blade span dimension, the blade further having a leading edge and a trailing edge; a blade inlet angle at the leading edge of the blade, the blade inlet angle defined as an angle between a local axis of the blade at the leading edge and a common axis; a blade outlet angle at the trailing edge of the blade, the blade outlet angle defined as an angle between a local axis of the blade at the trailing edge and the common axis; a camber angle defined as a difference in the blade inlet angle and the blade outlet angle; a mid-span region of the blade comprising a first camber angle; a tip end region of the blade comprising a second camber angle; and wherein a difference between the first and second camber angle is greater than 30 degrees and less than or equal to 70°.

As noted elsewhere herein, the present disclosure may relate to a gas turbine engine having a fan blade and/or fan stage according to any preceding aspect. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example, at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, 22 or 24 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C. 0.85 Mn is typical for large engines. 0.8 is for smaller thrust engines (twin aisle)

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
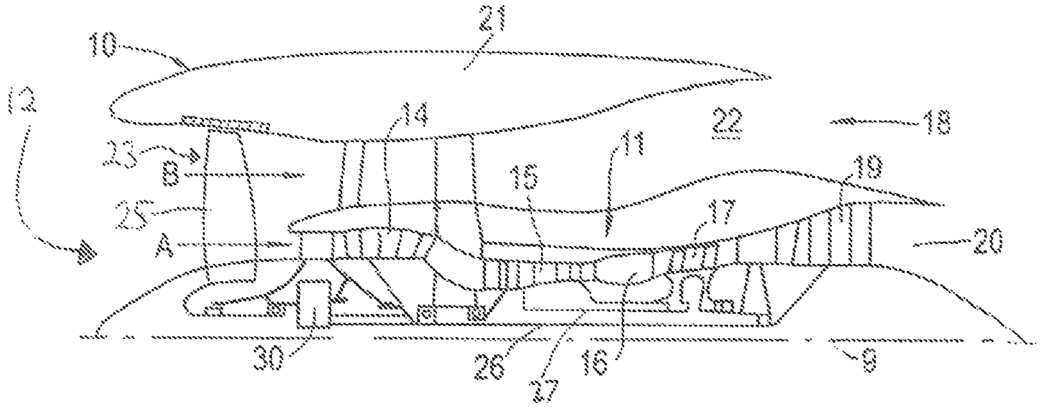
FIG. 1 is a sectional side view of a gas turbine engine.

FIG. 1 illustrates a gas turbine engine 10 having a principal rotational axis 9. The engine comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

The examples described hereinbelow concern a fan 23 that has been modified relative to a conventional fan by modifying the shape of the fan blades 25 thereof.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
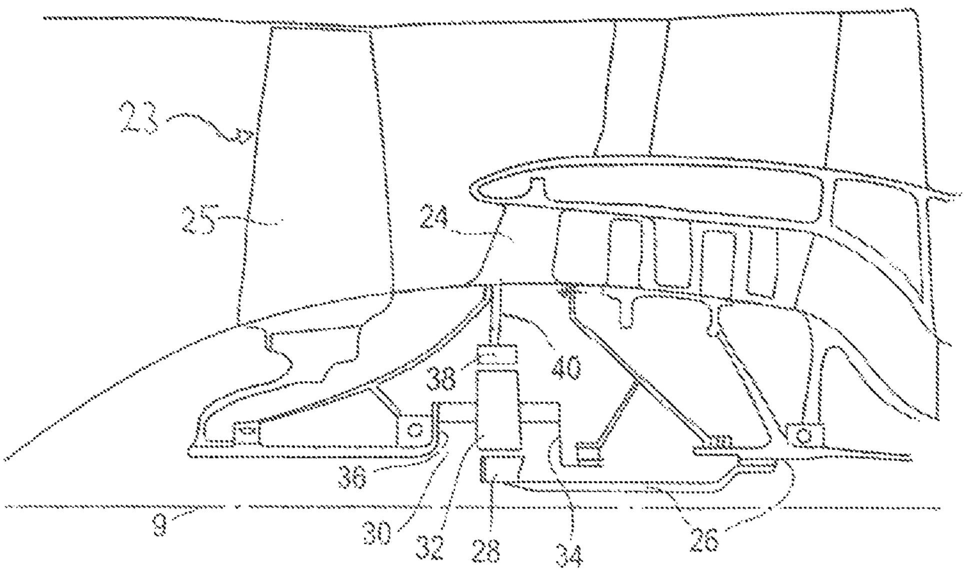
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
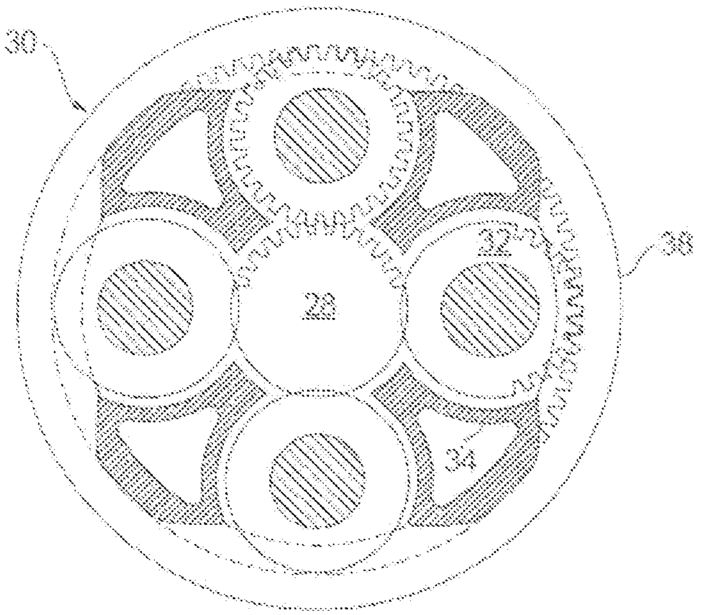
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
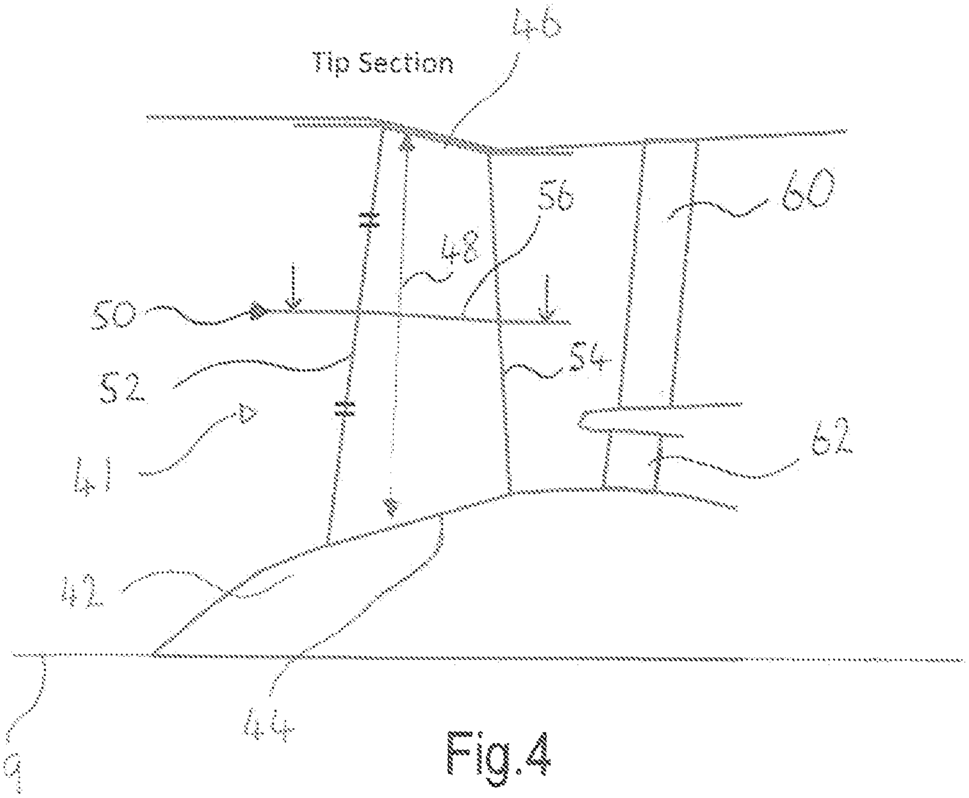
FIG. 4 is a schematic sectional side view of a fan region of a gas turbine engine.

FIG. 4 shows the geometry of a fan stage of a gas turbine engine. A fan blade 41 is attached to a hub 42 at a root end 44 and comprises a tip 46 at a distal/free end of the blade 41. The hub is configured to rotate about a principal engine axis 9 as described in relation to FIG. 1.

The tip 46 represents the radially outermost extent of the blade 41 with respect to the axis 9. A span dimension 48 extends between the root 44 and the tip 46, i.e. representing a radial height of the blade 41.

The blade 41 has a leading edge 52 and a trailing edge 54, each extending from the root end 44 to the tip 46. The leading and trailing edges 54 may have the same or different lengths, e.g. corresponding to a varying span profile A mid-span 50 is defined by a midpoint of the leading edge 52 of the blade 41 between the root end 44 and the tip 46, i.e. the radial height of the blade from the surface of the hub to the tip. A mid-span section 56 is defined by the section of the blade 41 at the mid-span 50. The mid-span section could be defined as a cross-section that is parallel to the axis 9 or else as a section that is in a plane containing the midpoint of the leading edge 52 and the midpoint of the trailing edge 54. A tip section 58 is defined by the cross section of the blade 41 at the tip 46 of the blade 41, e.g. in a plane containing the tip of the leading 52 and trailing 54 edges.

The fan is positioned in front of a bypass stator 60 and a core stator 62.

Figure 5:
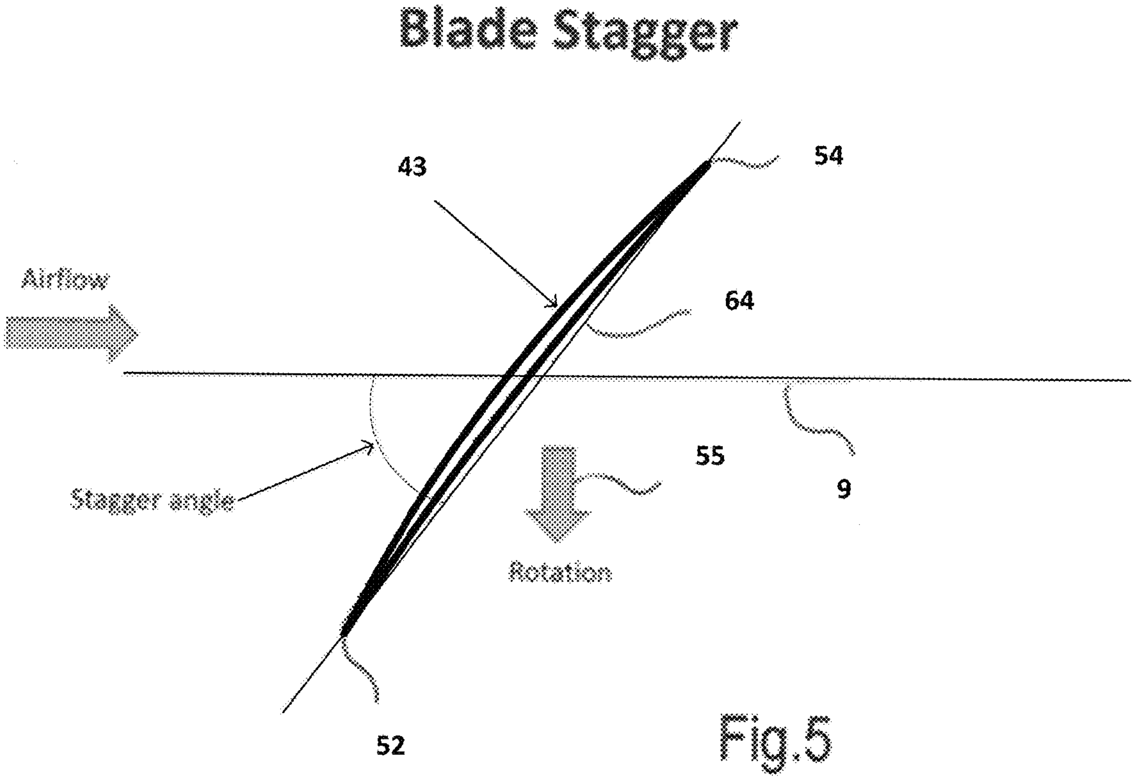
FIG. 5 is a sectional view of a fan blade of a gas turbine engine.

FIG. 5 shows a datum/normal sectional profile 43 of the blade 41 at the tip comprising leading 52 and a trailing 54 edges. A chord 64 defines a straight line extending between/through the leading edge 52 and the trailing edge 54. A chord length defines a length of the chord 64 between the leading 52 and trailing 54 edges.

The axis of rotation 9 is shown relative to the sectional profile as well as the direction of movement/rotation 55 of the blade 41 in use, i.e. perpendicular to the axis of rotation 9.

A stagger angle 66 of the blade 41 is defined by the angle the chord 64 makes relative to the rotation axis 9. A low stagger angle results in the blade 41 (i.e. chord 64) being angularly closer to the principal rotation axis 9; and a high stagger angle results in the blade being angularly further from the principal rotation axis 9 (i.e. closer to the direction of rotation 55).

Whilst the above description of the blade geometry of FIGS. 4 and 5 is for a conventional or datum blade 41, it applies equally to a modified blade 25, the features of which will be described below.

Figure 6:
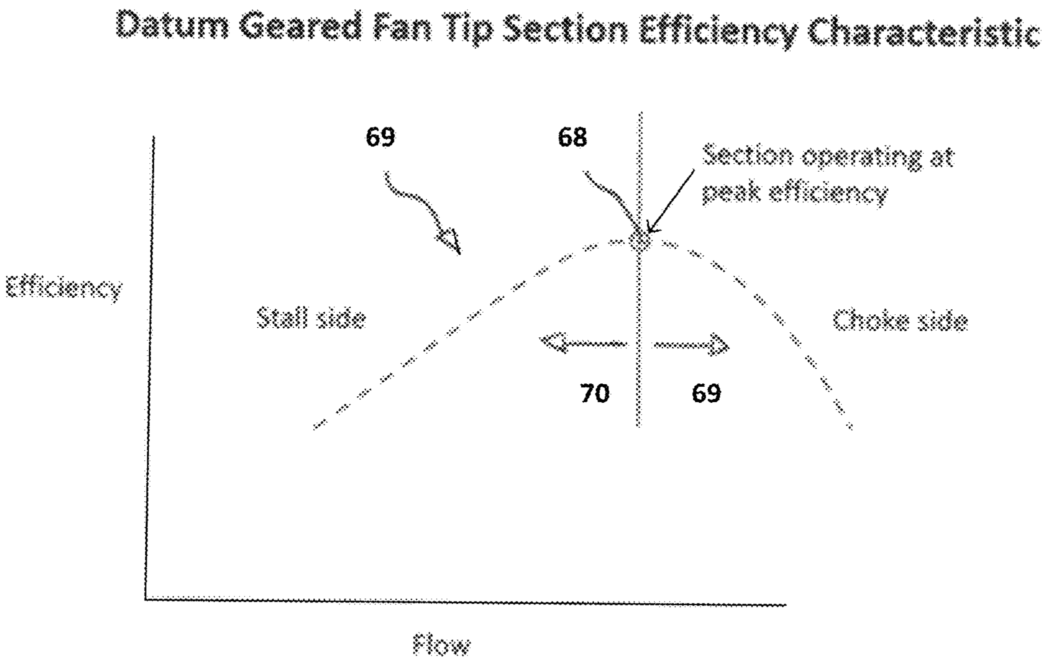
FIG. 6 is an efficiency versus air flow curve for a fan blade in a conventional system.

FIG. 6 shows a generic/datum example plot 69 of efficiency versus air flow for a fan blade tip section for a given rotational speed. Conventional fan blades are designed such that the sections of the blade all achieve their local peak efficiency 68 at the same point. This is normally designed to occur in the cruise operating region where the biggest benefit to fuel burn is achieved, thereby maximising the benefit of the overall peak efficiency of the fan blade. Each blade section is provided with a stagger angle 66 that yields a peak efficiency 68 that corresponds to the desired flow rate. The collection of desired sectional profiles along the span direction thereby define the overall blade profile. A section or blade that operates at a lower air flow than the peak efficiency 68 lies on the stall side 70 of the peak 68 and a blade that operates at a higher air flow than the peak lies on the choke side 72 of the peak 68.

Figure 7:
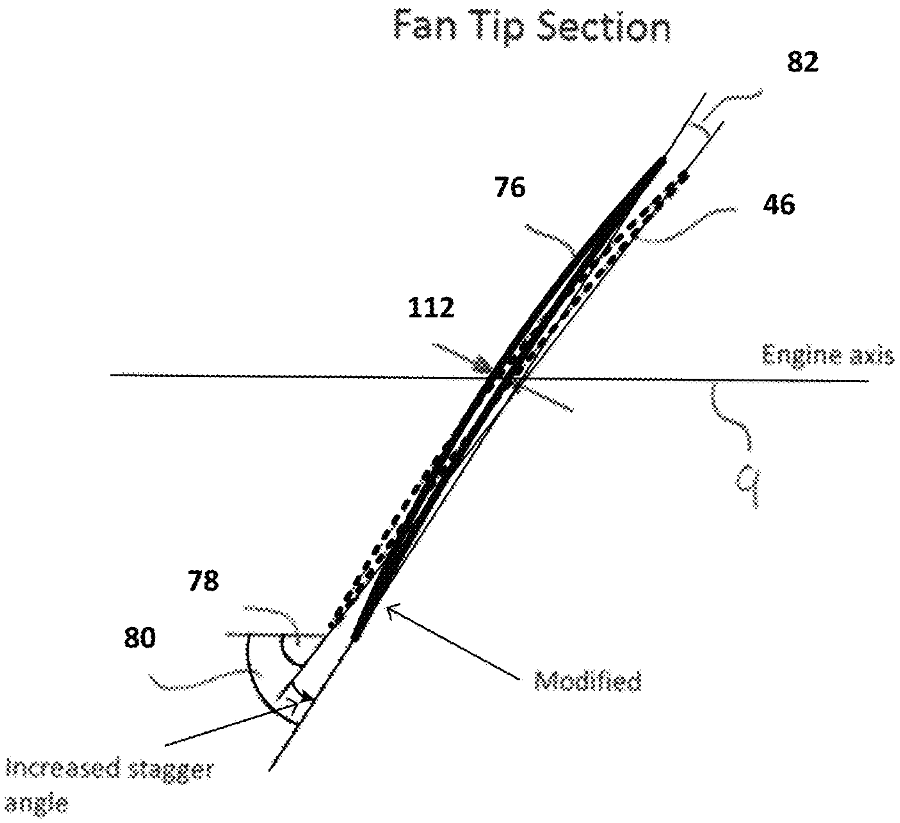
FIG. 7 is a sectional view of the tip of a fan blade.

FIG. 7 shows the cross-section 46 (in dashed lines) of the tip of a blade 41 for a conventional system designed to operate at peak efficiency 68. The cross-section 46 comprises a stagger angle 78.

FIG. 7 also shows a second cross-section 76 (in solid lines) of the tip of a modified blade 25 in accordance with an example of the present disclosure. The second cross section 76 comprises a stagger angle 80. The blade section 76 has an increase 82 in stagger angle (i.e. angled further away from the principal rotation axis 9) with respect to the stagger angle 78 of blade tip section 46 designed for operation at a conventional peak efficiency.

The tip stagger angle 80 of section 76 may be at least 1°, 3°, 5°, 7° or 9° higher than stagger angle 78. The tip stagger angle 80 of section 76 may be up to 10°, 12° or 14° higher than the stagger angle 78. Any of the above min and max values of tip stagger angle increase may be combined to define a range in which the tip stagger angle may lie.

The blade section 76 operates on the choke side of the peak efficiency 68.

Figure 8:
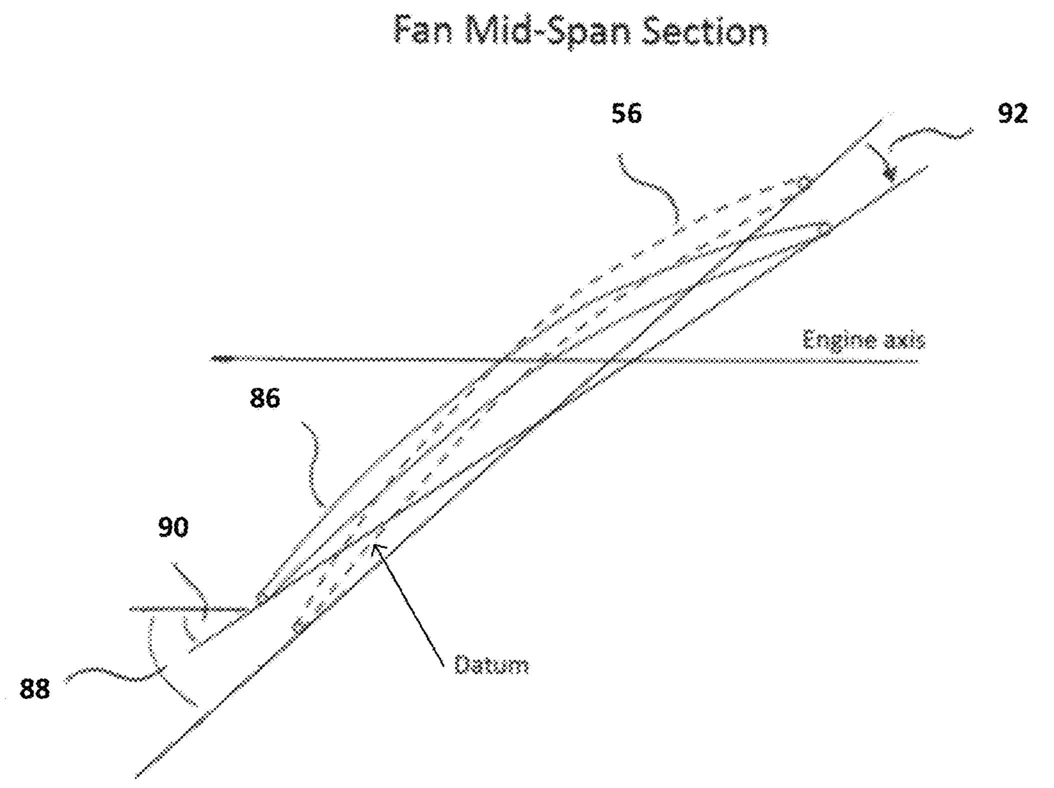
FIG. 8 is a sectional view of the mid-span of a modified fan blade.

FIG. 8 shows a first cross-section 56 (in dashed lines) of the mid-span of a conventional blade 41 designed to operate in accordance with a normal peak efficiency. The first cross-section 56 comprises a stagger angle 88.

FIG. 8 further shows a second cross-section 86 (in solid lines) of the mid-span of a modified blade 25 in accordance with an example of the present disclosure. The second cross section 86 comprises a stagger angle 90.

The blade section 86 has a decrease 92 in stagger angle (i.e. angled more towards a parallel axis of the principal rotation axis 9) with respect to the stagger angle 88 of blade mid-span section 56.

The modified mid-span stagger angle 90 may be at least 1°, 3°, 5°, 7° or 9° lower than the stagger angle 88. The modified mid-span stagger angle 90 may be up to 10°, 12°, or 14° lower than the stagger angle 88 to produce a conventional peak efficiency. Any of the above min and max values of mid-span stagger angle decrease may be combined to define a range in which the mid-span stagger angle may lie.

The combination of a higher stagger at the tip section 76 and a reduced stagger at the mid-span section 86 results in the modified blade 25 having a larger stagger angle change between the mid-span 50 and tip. This may be described as a blade that is twisted to a greater extent than is conventional between the mid span and tip.

The change in stagger angle between the mid-span section and the tip section is greater than or equal to 20°, 25°, 30° 35°, 40° and less than or equal to 60°, 65°, 70°, 75°, or 80°. In some examples, the change in stagger angle between the mid-span section and the tip section may be greater than or equal to 36°, 37° 38°, 39°, 40°, 41°, or 42° and less than or equal to 60°, 65°, 70°, 75°, or 80°. The precise value of twist selected may be based at least in part on the hub-to-tip ratio of the fan blades and/or the intended speed of rotation in use. That is to say, the speed of the blade tip is greater than the speed of the mid-span by an amount according to the radial length of the fan blades. For relatively slow rotation speeds associated with more efficient engines a relatively smaller change in stagger angle may be desirable.

The twist between the mid and tip section can be adapted to take into account the aerodynamic robustness of the corresponding sections. A section robustness depends on the amount of pressure ratio generated by that section (camber and rotational speed), the incoming Mach number at the section leading edge together with the chord allocated to that section to generate the flow turning. A key parameter to set the required chord is solidity, defined as the ratio of chord and blade to blade spacing at the section height. The aerodynamic robustness together with the requirements on blade weight, stress modal frequencies and mode shapes will help at defining an optimum blade twist added to the conventional, nearly-linear blade-speed-related twist between the hub and tip sections.

A high stagger angle of the type disclosed herein may be referred to as the blade being ‘over-closed’.

The modified blade 25 provides an increased rate of change of stagger angle local to the blade tip, which provides greater aerofoil lean (pressure surface inward, suction surface outward) local to the blade leading edge.

Figure 9:
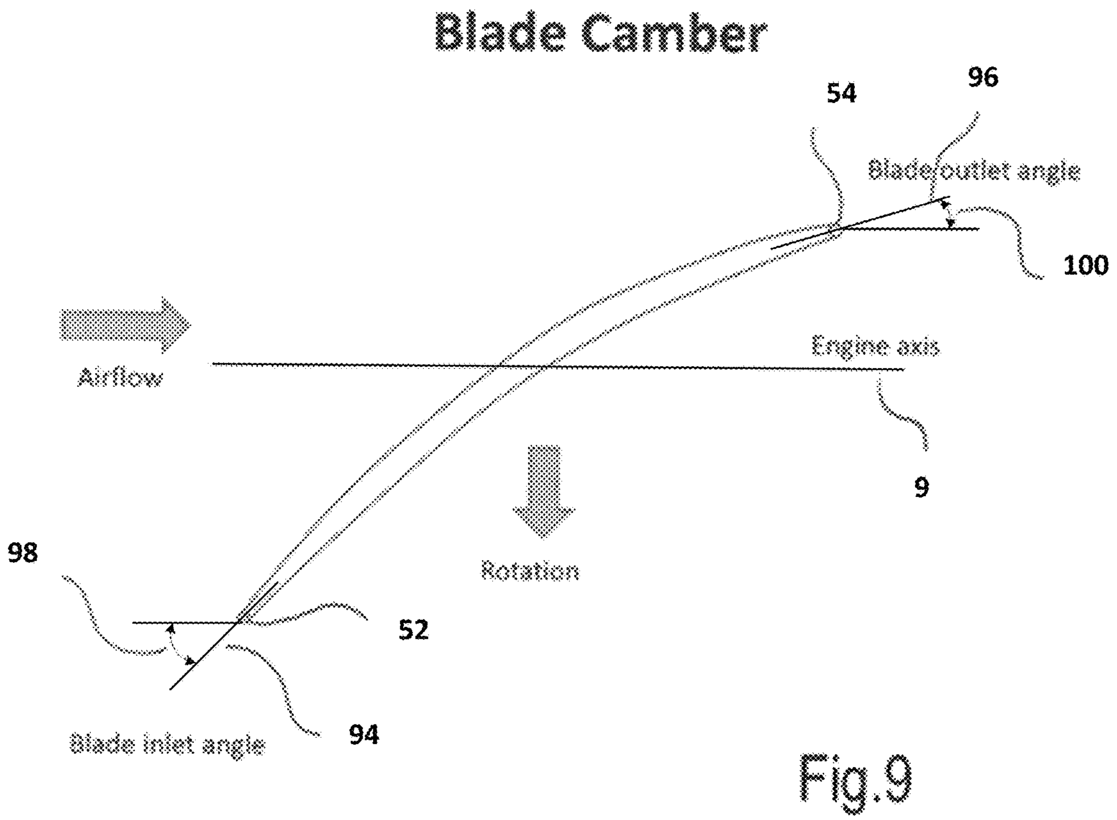
FIG. 9 is a sectional view of a fan blade of a gas turbine engine.

As shown in FIG. 9, the leading edge 52 of the blade 41 comprises a blade inlet angle 98. The blade inlet angle 98 is defined as the angle between the local axis 94 of the blade 41 at the leading edge 52 and the rotation axis 9.

The trailing edge 54 of the blade 41 comprises a blade outlet angle 100. The blade outlet angle 100 is defined as the angle between the local axis 96 of the blade 41 at the trailing edge 52 and the rotation axis 9. A camber angle for a blade section (i.e. blade 25 or 41) is defined as the difference in the blade inlet angle 98 and the blade outlet angle 100.

The tip section 76 of the modified blade 25 may comprise a camber angle of less than 15°. In some examples, the tip section 76 of modified blade 25 may comprise a camber angle of greater than or equal to 0° and less than or equal to 15°. This threshold may be used to protect the robustness of the tip section which operates at the highest leading edge Mach number and whose chord is limited by mechanical requirements.

The midspan section of the modified blade 25 may comprise a camber angle of greater than or equal to 40°, 45°, or 50° and less than or equal to 60°, 65°, 70°, or 75°. This threshold may be used since the mid-section provides the highest pressure rise, e.g. since it has the best robustness in terms of combination of lower leading edge Mach number whilst still provided with a significant rotational speed to generate a large enthalpy rise.

In various examples of this disclosure, the difference in camber angle between the mid-span section 86 and the tip section 76 may be greater than or equal to 30° and less than or equal to 65°, 70°, or 75°. The difference in camber angle between the mid-span section and the tip section may be greater than or equal to 31°, 32° or 33°, and less than or equal to 68°, 69°, or 70°.

This difference in camber may characterise aspects of this disclosure, e.g. instead of, or in addition to, the change in stagger angle between the mid-section and tip. The difference in camber angle may be described as a blade that undergoes a greater change in curvature between the mid-section and tip. This may be described as a blade that is more arched than a conventional blade towards the mid-section and/or less arched (i.e. flatter) than a conventional blade towards its tip.

Figure 10:
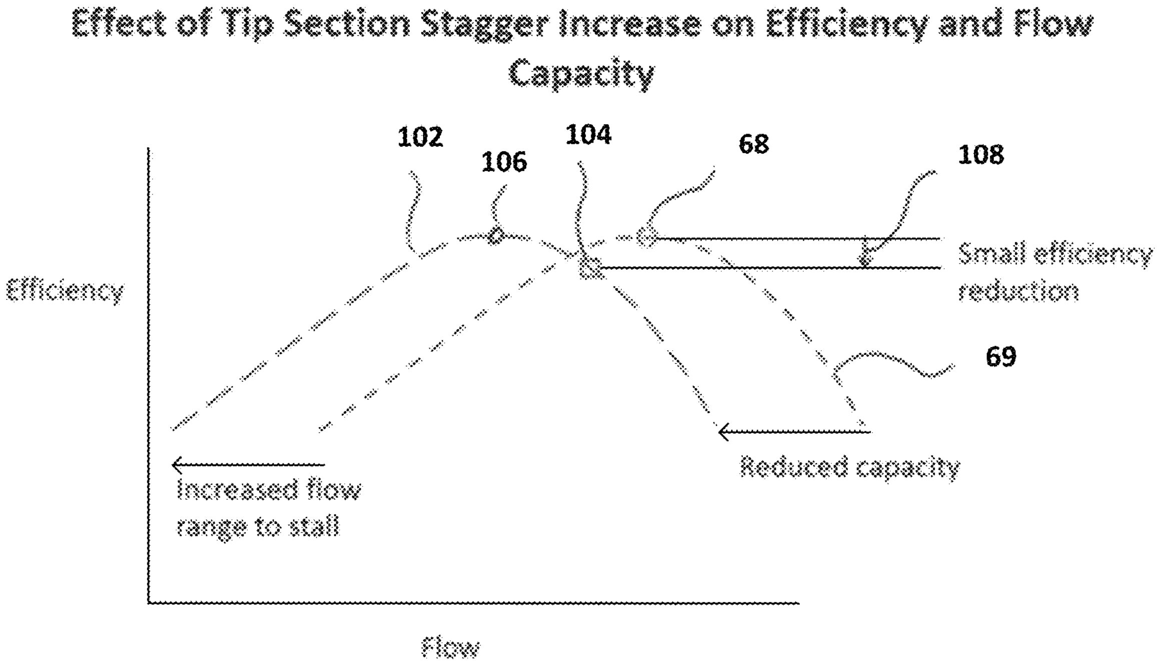
FIG. 10 is an efficiency versus air flow curve for a fan blade in a conventional system and a modified fan blade; and, FIG. 11 is an efficiency versus air flow curve for a fan blade in a conventional system; a modified fan blade; and further modified fan blade.

FIG. 10 shows the engine efficiency versus flow curve for an example 102 of a modified fan blade tip section 76 (e.g. in a geared turbofan) and the conventional curve 69 of FIG. 6.

The tip sections 76 of the fan blades 25 are deliberately designed to operate away from their local peak efficiency 106, as shown by point 104 in FIG. 10, i.e. on the choked side of their loss loops.

By designing the tip sections of the fan blades 25 on the choke side of their loss loops, away from their local peak efficiency, they have a greater flow range before stall, which gives the overall fan blade 25 a greater stability margin.

A key feature of geared fans is the reduced rotational speed of the fan blades, which reduces inlet relative flow Mach number. This lower Mach number gives shallower efficiency characteristics (or loss loops) which allows the tip sections of the fan blade to be operated away from their local peak efficiency with only a small efficiency reduction 108.

FIG. 10 shows that increasing the stagger of the fan tip sections reduces their flow capacity. If the overall capacity of the fan blade is not to be reduced the capacity of the blade inboard of the tip can be increased as described in relation to FIG. 8. This is achieved by opening the blade 25 (i.e. a reduced stagger) in the mid-span region. The mid-span region operates at a lower leading edge Mach number, due to being closer to the axis of rotation 9, and higher solidity (Blade chord/blade spacing/pitch ratio), and hence is inherently more aerodynamically robust in terms of efficiency, flow capacity and stability margin. Whilst the examples given above concern the mid-section, i.e. at half the blade span, it will be appreciated that the relevant changes may be made to a region comprising the mid-section or close to the mid-section.

Figure 11:
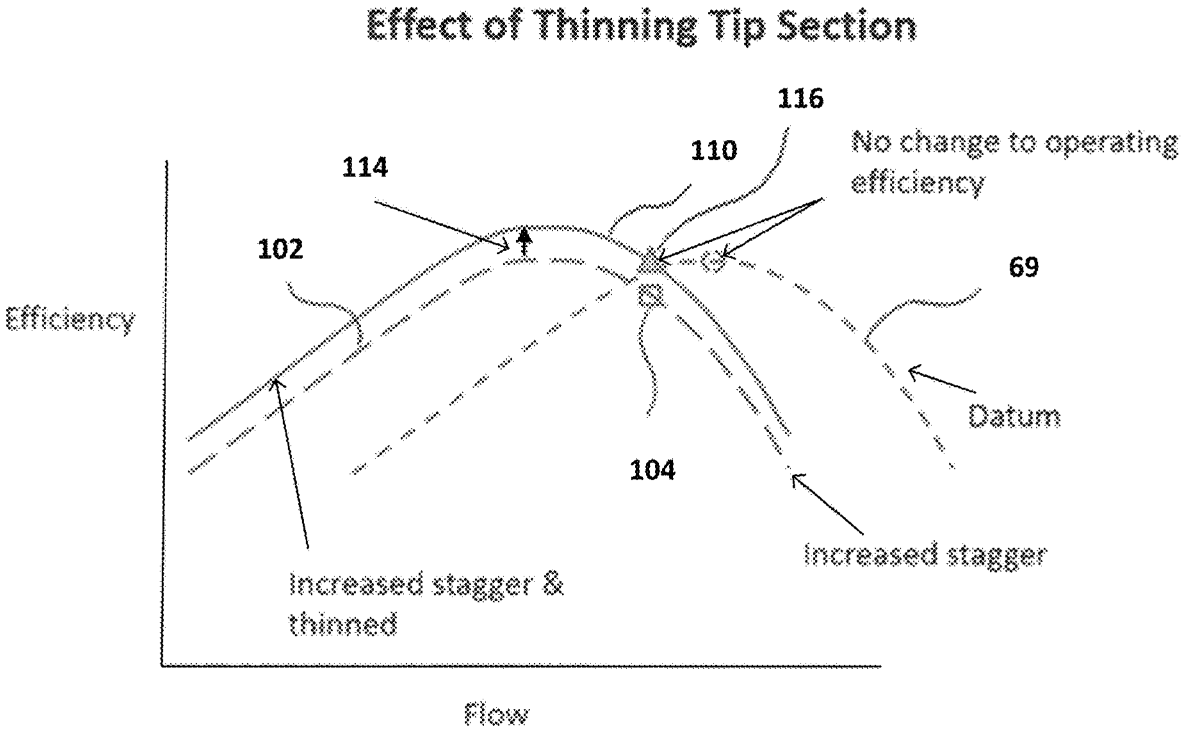

FIG. 11 shows a flow versus efficiency curves 69 and 102 of FIG. 10 but including a plot/curve 110 for a further modified blade section that is thinner than the sections 46 and 76. In this regard it has been found to be a benefit of the modified fan blade 25 geometry described herein that the maximum tip thickness, i.e. the dimension 112 shown in FIG. 7, can be reduced by at least 5% relative to a conventional blade (i.e. a blade of optimal thickness for a conventional stagger angle 78 at the tip). In differing examples, the maximum tip thickness may be reduced by at least 10%, 15%, 20%, 25%, 30% or 35%. The tip thickness may be reduced by up to 30%, 35% or 40%. Any range of tip thickness reduction may be applied as defined by the optional min/max thresholds given above.

The reduction in thickness of the blade tip creates a corresponding reduction in weight towards the tip. A reduction in thickness of the blades 25 towards the tip would reduce structural strength. However, a key design consideration affecting the required strength of fan blades is the ability to withstand bird strike (or other foreign object impact). It has been found that the higher tip stagger provides a bird strike benefit due to a lowering of the incidence angle of birds/objects entering the engine intake relative to the rotating fan blade.

The typical axial velocity of a bird/object entering an engine is much lower than the air velocity into the engine. This normally results in a significant incidence angle relative to the blade leading edge and can result in significant bending or cupping of the blade leading edge geometry upon impact. The higher stagger fan tip sections disclosed herein reduce the incidence angle onto the leading edge, making the blade inherently more robust to bird, or foreign object, strikes.

This allows the tip sections to be thinned, thereby improving aerodynamic performance without compromising structural integrity. The beneficial impact of thinning the fan blades 25 towards the tip, and thereby reducing weight, can be seen by way of the efficiency improvement 114 between curves 102 and 114 in FIG. 11.

This allows the increased stagger angle tip section 76 to operate on the choke side of the peak efficiency, as shown by operating point 116 on curve 110, whilst still maintaining an operating efficiency that is the same as, or similar to, optimal point 68 for curve 69.

The modified blades 25 are mounted/attached to the hub 42 in a conventional array (i.e. with the desired circumferential/angular spacing) so as to provide a fan assembly or fan stage to be used in a gas turbine engine 10 for an aircraft.

Potential Advantages

The modified blade can increase the flow range ΔF before which the fan blade will stall. This gives the blade a greater stability margin.

The modified blade maintains overall fan blade capacity.

The modified blade reduces the operating pressure ratio of the fan tip sections and increases the operating pressure ratio of the mid-height sections of the blade. This maintains high efficiency.

The modified blade gives a bird strike benefit due to a lower bird incidence rate. This allows the tip sections to be thinned relative to a conventional blade, e.g. helping the whole engine fan blade out loads, out of balance loads and protecting the fan blade structural forcing thanks to higher blade frequencies. This may contribute to an efficiency increase $\Delta e_2$ of the tip sections and/or may offset any efficiency loss due to designing the sections on the choke side of peak efficiency.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A fan stage of a ducted fan gas turbine engine, comprising:

a rotor hub having a principal axis of rotation; and a plurality of fan blades, each blade having a hub end attached to the hub and extending radially outwardly towards a tip end so as to define a blade span dimension, each blade further having a leading edge and a trailing edge, a chord for a section of the blade being a straight line joining the leading and trailing edges within the section and a stagger angle being the angle formed between the chord and the principal axis of rotation;

a blade inlet angle at the leading edge of the blade, the blade inlet angle defined as an angle between a local axis of the blade at the leading edge and the principal rotation axis;

a blade outlet angle at the trailing edge of the blade, the blade outlet angle defined as an angle between a local axis of the blade at the trailing edge and the principal rotation axis;

a camber angle defined as a difference in the blade inlet angle and the blade outlet angle;

a mid-span region comprising a camber angle;

a vicinity of the tip end comprising a different camber angle; and where a camber angle difference between the mid-span camber angle and the camber angle in the vicinity of the tip end is greater than or equal to 30° and less than or equal to 180°, wherein the mid-span region comprises a region between 40% and 60% of the blade span between the hub end and tip end, wherein the vicinity of the tip end comprises a region within 5% of the blade span or less from the tip end, wherein a difference between the stagger angle in a mid-span region of each blade and the stagger angle in a vicinity of the tip end of each blade is greater than or equal to 20°, and less than or equal to 80°, wherein the mid-span region camber angle is greater than 45 degrees and less than or equal to 70 degrees, and wherein the camber angle in the vicinity of the tip end is greater than or equal to 0 degrees and less than or equal to 15°.

2. The fan stage according to claim 1, wherein the difference between the stagger angle in the mid-span region of each blade and the stagger angle in the vicinity of the tip end is greater than or equal to 35° and less than or equal to 80°.

3. The fan stage according claim 1, wherein the stagger angle in the mid-span region comprises the stagger angle for a blade section at a midpoint of the blade span.

4. A fan blade for a gas turbine engine, comprising:

a hub end for attachment to a rotor hub in use, the blade extending from the hub end towards a tip end so as to define a blade span dimension, the blade further having a leading edge and a trailing edge, a chord for a sectional profile of the blade being a straight line joining the leading and trailing edges within the sectional profile;

wherein a relative difference in angle between a chord in a mid-span region of the blade, wherein a mid-span region of the blade comprises a region between 30% and 60% of the blade span between the hub end to the tip end, and a chord in a vicinity of the tip end of the blade is greater than or equal to 30° and less than or equal to 80°;

a blade inlet angle at the leading edge of the blade, the blade inlet angle defined as an angle between a local axis of the blade at the leading edge and a common axis;

a blade outlet angle at the trailing edge of the blade, the blade outlet angle defined as the angle between the local axis of the blade at the trailing edge and the common axis;

a camber angle defined as a difference in the blade inlet angle and the blade outlet angle;

a mid-span region comprising a camber angle;

a tip end region comprising a different camber angle;

wherein a camber angle difference between the mid-span region and the vicinity of the tip end is greater than 30 degrees and less than or equal to 70°, wherein the vicinity of the tip end comprises a region within 5% of the blade span or less from the tip end, wherein the mid-span region camber angle is greater than 45 degrees and less than or equal to 70°, and wherein the camber angle in the vicinity of the tip end is greater than or equal to 0 degrees and less than or equal to 15°.

5. The fan blade according to claim 4, wherein the chord in the mid-span region comprises a chord at a midpoint of the blade span.

6. The fan blade according to claim 4, wherein the camber in both the mid-span region and the vicinity of the tip end is an acute angle.

7. A fan stage of a ducted fan gas turbine engine, comprising:

a rotor hub having a principal axis of rotation;

a plurality of fan blades, each blade having a hub end attached to the hub and extending radially outwardly towards a tip end so as to define a blade span dimension, each blade further having a leading edge and a trailing edge, a chord for a section of the blade being a straight line joining the leading and trailing edges within the section and a stagger angle being the angle formed between the chord and the principal axis of rotation;

a blade inlet angle at the leading edge of the blade, the blade inlet angle defined as an angle between a local axis of the blade at the leading edge and the principal rotation axis;

a blade outlet angle at the trailing edge of the blade, the blade outlet angle defined as an angle between a local axis of the blade at the trailing edge and the principal rotation axis;

a camber angle defined as a difference in the blade inlet angle and the blade outlet angle;

a mid-span region comprising a camber angle;

a vicinity of the tip end comprising a different camber angle; and wherein a camber angle difference between the mid-span camber angle and the camber angle in the vicinity of the tip end is greater than or equal to 30° and less than or equal to 60°, wherein the mid-span region comprises a region between 40% and 60% of the blade span between the hub end and tip end, wherein the vicinity of the tip end comprises a region within 5% of the blade span or less from the tip end, wherein the difference between the stagger angle in a mid-span region of each blade and the stagger angle in the vicinity of the tip end of each blade is greater than or equal to 20° and less than or equal to 70°, wherein the mid-span region camber angle is greater than 45 degrees and less than or equal to 70°, and wherein the camber angle in the vicinity of the tip end is greater than or equal to 0 degrees and less than or equal to 15 degrees.

* * * * *